Figure 1:
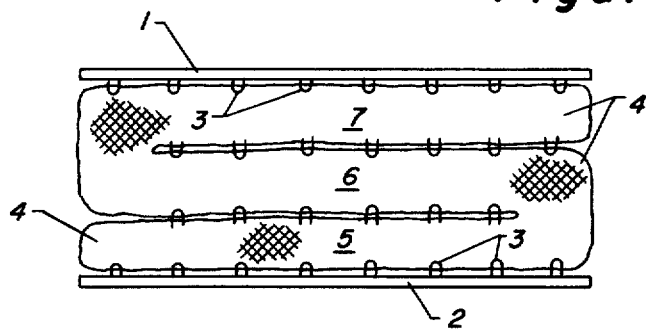

United States Patent [19]
Nicolai

[11] 3,956,192
[45] May 11, 1976

[54] CATALYST CARRIER
[75] Inventor: Dieter Nicolai, Meerhole, Germany
[73] Assignee: Universal Oil Products Company, Des Plaines, Ill.
[22] Filed: Oct. 7, 1974
[21] Appl. No.: 512,660

[30] Foreign Application Priority Data
Oct. 26, 1973  Germany............................ 2353640

[52] U.S. Cl............................................ 252/477 R
[51] Int. Cl.². ........................................ B01J 35/02
[58] Field of Search............. 252/477 R; 23/288 FC; 29/191.6

[56] References Cited
UNITED STATES PATENTS
3,362,783  1/1968  Leak ............................... 252/477 R Primary Examiner—W. J. Shine
Attorney, Agent, or Firm—James R. Hoatson, Jr.; Philip T. Liggett; William H. Page, II

[57]  ABSTRACT

A metal catalyst carrier wherein a plurality of interlaced woven round wire catalyst supports are packed in multiple layers, each layer being formed of wire which is of an interwoven loop construction, such layers being held between heat resistant support screens, and being maintained in an S-arrangement configuration.

1 Claim, 4 Drawing Figures

CATALYST CARRIER

The invention relates to a catalyst carrier having a raw body consisting of metal wire distributed as uniformly as possible throughout the volume between support screens.

For the reduction of oxides of nitrogen and similar chemical processes in air purification, use has been made for some time of catalyst carriers of the aforesaid kind in which flat wires serve as filling, that is to say as the raw body material. The latter is produced by crimping and bending flat wire material on a machine. The crimped strips then are weighed and placed as individual threads into a frame. By means of holding pins and mesh-like support webbing of thicker metal wire the individual crimped threads are held in a fixed position. The crude body is then pressed to the desired thickness and sewed up.

For such a catalyst carrier, obtaining the uniform distribution of the metal wires is essential. In making the conventional catalyst carriers, distribution is corrected by inserting screwdriver-like tools into the raw body and therein shifting the positioning of the metal wires, as for example, pulling ball formations apart. This results in a great amount of work for performing it well and therefore is wasteful, time consuming work. Moreover, the laid-in flat wires forming the crude body are readily deformable or movable in the absence of support screens, that is to say a position once imparted to them is very easily changed. For these reasons the support screens need to have considerable strength such that an increased weight of the overall catalyst carrier results in a disadvantageous manner. The presently known embodiments, moreover, have the disadvantage that for the production of an adequately thick, relatively high catalyst carrier will have several partial bodies that are, in turn, each provided on each side with support screens that have to be placed on top of each other. Two support screens are, therefore, present in between the individual partial bodies, and there is imparted a considerable weight to the total body.

Furthermore, a certain uneven flow of the flowthrough of gases has occurred in the known catalyst carriers because the above-described manual work of shifting wires to obtain uniform distribution of the flat wires does not always lead to desired uniformly good results. The onesided use and wear are directly related thereto.

It is the object of the present invention to produce and form a catalyst carrier of the initially mentioned kind in such manner that there is avoidance of the manual work to effect uniform distribution of the metal wire throughout the volume, as well as a weight diminution to the resulting carrier unit and the improved ability of effecting reactivation.

The object is attained according to the invention in that the crude body has several superimposed and mutually fixed layers knitted, interlaced or woven of an "endless" alloy wire heat-resistant to 800°C. The knitting, interlacing or weaving operation on the metal wire is possible mechanically without difficulty and with outstandingly uniform distribution, so that a kind of mat or perhaps also matted bands are producible which form the layers of the catalyst carrier. By simple packing of one on the other, or laying together of the desired number of knitted mats the desired thickness of catalyst carrier is easily obtainable. The rigidity of the woven mat is increased by the interlocking of the individual threads. The catalyst carrier thus produced according to the invention possesses a good uniform distribution of the wire over the entire cross-section and will also cause a very low pressure drop for the flow through of gases in consequence of the machine-made interlinking of the individual threads.

A further considerable advantage of the catalyst carrier according to the invention resides in the diminution of the total weight because the aforementioned support screens do not have to be utilized between the individual mats or layers. Due to the manner of interlacing, knitting or weaving of the new mats or layers forming the raw body they have in themselves a certain firmness so that the support screens are superfluous. As a result of the screen elimination, the flowthrough properties of the new catalyst carrier are still further enhanced.

In one suitable embodiment of the invention, the wire for the layers forming the raw body is a round wire. Although one would ordinarily assume that a flat wire creates a more intensive catalyst action and that the geometry of the round wire is regarded as not comparably effective, it has been found, surprisingly, that the catalyst of the present invention brings about not merely equal, but comparatively better results for the knitted, interlaced or woven structure of the layers.

The invention furthermore is advantageously embodied by crimping the raw body of knitted wire. In other words, a still greater stiffness is attained which leads to a further increase in the resistance to movement of the layer forming the raw body so that the intermediate support screens or other support webbings frequently used in the case of the known catalyst carriers can be dispensed with.

By the use of fewer construction parts the time for finishing the catalyst carrier of the invention is less. Moreover, the finished catalyst having the new carrier is more satisfactorily regeneratable.

Figure 2:
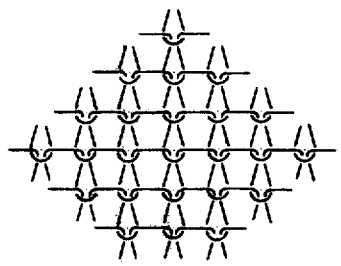
Figure 3:
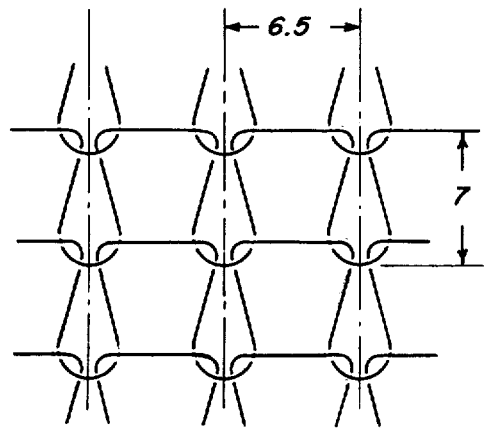

Further features, advantages and possibilities of use of the present invention are evident from the following description in connection with the drawings. There are shown in:

FIG. 1 the catalyst carrier in the finished state,

FIG. 2 a specific sample of interlacing,

FIG. 3 an enlarged illustration of a cut-out of the sample of FIG. 2, and

Figure 4:
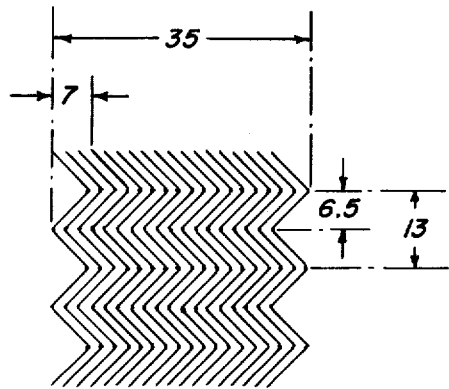

FIG. 4 a portion of a crimped raw body with 18 woven layers.

In FIG. 1 the catalyst carrier is shown in the finished state, but without the surrounding frame with the aid of which it is placed and fastened in proper position in an apparatus unit. Above and below, the support screens 1 and 2 are seen between which the raw body 4 is arranged with the aid of pins, loops or the like 3. Seen in cross-section, it is packed up in S-form in three layers 5, 6 and 7. These likewise are fixed one to the other by pins. Intermediate support screens are dispensed with because of the higher resistance to moment of the woven raw body 4. The raw body itself consists of a round wire having a diameter of 0.23 mm and being of the Ni 40 quality.

Supplementally it is mentioned that also a wire of other crosssection can be used, for example that of an ellipse, square, rectangle or the like.

The round wire shown for the specific embodiment of the drawings is interwoven by loops according to the example of FIG. 2 and FIG. 3, respectively, which then is shaped into the packet of definite geometry formed by the layers 5, 6 and 7. It has been stated above that the wire is endless. This signifies, more particularly, that for the production of the layer the wire is woven or interlaced in a kind of an all-roound sock. This sock, in a particular embodiment, may also be cut open so that the wire can then no longer be regarded as "endless" in the strict sense of the word. It is also possible in other embodiments not illustrated, to stratify two or more layers on top of each other, instead of packing them together in S-form as illustrated in FIG. 1.

According to FIG. 4 the individual layers are crimped for stablizing the mat.

The loop size is dependent on the wire diameter and the wire quality. It should be kept as small as possible.

The lower pressure drop in the carrier upon its catalytic coating by a galvanic process results in an improved regenerability of the new catalyst. Measurements have shown that, relative to the conventional catalyst carriers, a 30% diminution of the pressure drop is obtained.

I claim as my invention:

1. In an all metal catalyst carrier providing uniformly distributed wire throughout the body thereof, the combination comprising a plurality of layers of interlaced, woven, round wire packed one above the other, with each layer of said wire being of an endless, knitted mesh, interwoven loop construction and of a high temperature heat-resistant resistant alloy, a plurality of heat-resistant support screens, said layers being positioned and held between said heat-resistant support screens, and said layers being positioned in an S-arrangmement resulting from the laying of a single endless configuration of said wire.

* * * * *